(12) United States Patent
Mao et al.

(10) Patent No.: US 11,775,255 B2
(45) Date of Patent: Oct. 3, 2023

(54) SORTING DEVICE

(71) Applicant: REALTEK SEMICONDUCTOR CORPORATION, Hsinchu (TW)

(72) Inventors: Wenyi Mao, Suzhou (CN); Hui Li, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 617 days.

(21) Appl. No.: 16/869,883

(22) Filed: May 8, 2020

(65) Prior Publication Data

US 2020/0364029 A1  Nov. 19, 2020

(30) Foreign Application Priority Data

May 15, 2019  (CN) .......................... 201910400504.5

(51) Int. Cl.
*G06F 16/00* (2019.01)
*G06F 7/36* (2006.01)
*G06F 16/906* (2019.01)
*G06F 16/9035* (2019.01)

(52) U.S. Cl.
CPC .............. *G06F 7/36* (2013.01); *G06F 16/906* (2019.01); *G06F 16/9035* (2019.01)

(58) Field of Classification Search
CPC ....... G06F 7/36; G06F 16/906; G06F 16/9035
See application file for complete search history.

(56) References Cited

U.S. PATENT DOCUMENTS

2018/0341487 A1\* 11/2018 Kim ...................... G06F 9/3001

\* cited by examiner

*Primary Examiner* — Tony Mahmoudi
*Assistant Examiner* — Suman Rajaputra
(74) *Attorney, Agent, or Firm* — WPAT, P.C

(57) ABSTRACT

Disclosed is a sorting device configured to sort N numbers with N rounds of sorting processes from a first round sorting process to an $N^{th}$ round sorting process and obtain N-rounds sort results from a first-round sort result to an $N^{th}$-round sort result, wherein at least two pairs of numbers of the N numbers are sorted in each of the N rounds of sorting processes concurrently, a $K^{th}$-round sort result is dependent on a $(K-1)^{th}$-round sort result, the $N^{th}$-round sort result is the N numbers in a descending/ascending order, and the N is an integer greater than two. The sorting device includes sorting circuits and duplicating circuits that are selectively used for each of the N rounds of sorting processes. Each sorting circuit is configured to sort two numbers and obtain the collating sequence of the two numbers. Each duplicating circuit is configured to output a number it received.

9 Claims, 10 Drawing Sheets

SORTING DEVICE

BACKGROUND OF THE INVENTION

1. Field of the Invention

The present disclosure relates to a sorting device, especially to a sorting device capable of parallel computing.

2. Description of Related Art

A general sorting algorithm (e.g., Bubble Sort) has strong dependence on the past sort result and thus the hardware circuit using this kind of sorting algorithm is hard to implement parallel computing. In order to fulfill the requirements of high speed circuits, this technical field needs a simple sorting device capable of parallel computing.

SUMMARY OF THE INVENTION

An object of the present disclosure is to disclose a simple sorting device capable of parallel computing.

An embodiment of the sorting device of the present disclosure is operable to continuously perform N rounds of sorting processes from a first round sorting process to an $N^{th}$ round sorting process in turn to sort N numbers that are in an initial order and thereby obtain N-rounds sort results from a first-round sort result to an $N^{th}$-round sort result in turn, wherein at least two pairs of numbers of the N numbers are sorted concurrently in each of the N rounds of sorting process and the N is an integer greater than two. This embodiment includes X sorting circuits and Y duplicating circuit(s), wherein the X is an integer greater than one and the Y is a positive integer. Each of the X sorting circuits is configured to sort two numbers of the N numbers and thereby obtain a collating sequence of the two numbers. Each of the Y duplicating circuit(s) is configured to receive an input number and output it as an output number. The X sorting circuits and the Y duplicating circuit(s) are selectively used in each of the N rounds of sorting processes, and each of the N rounds of sorting processes makes use of at least one of the X sorting circuits.

Another embodiment of the sorting device of the present disclosure is operable to continuously perform N rounds of sorting processes from a first round sorting process to an $N^{th}$ round sorting process in turn to sort N numbers that are in an initial order and thereby obtain N-rounds sort results from a first-round sort result to an $N^{th}$-round sort result in turn, wherein at least two pairs of numbers of the N numbers are sorted concurrently in each of the N rounds of sorting process and the N is an even integer greater than three. This embodiment includes a plurality of sorting circuits and a plurality of duplicating circuits. The plurality of sorting $$\frac{N}{2}$$

circuits are configured to sort sets of numbers of the IN numbers according to a $(K-1)^{th}$-round sort result of the N-rounds sort results and thereby obtain a $K^{th}$-round sort result of the N-rounds sort results including a $K^{th}$-round highest ranking number and a $K^{th}$-round lowest ranking $$\frac{N-2}{2}$$

number; and the plurality of sorting circuits are also configured to sort sets of numbers of the N numbers exclusive of the $K^{th}$-round highest ranking number and the $K^{th}$-round lowest ranking number according to the $K^{th}$-round sort result and thereby obtain a $(K+1)^{th}$-round sort result of the N-rounds sort results without a $(K+1)^{th}$-round highest ranking number and a $(K+1)^{th}$-round lowest ranking number, wherein each set of the $$\frac{N}{2}$$

sets or numbers and the $$\frac{N-2}{2}$$

sets of numbers includes two number of the N numbers, numbers sorted by one of the plurality of sorting circuits are different from numbers sorted by any other one of the plurality of sorting circuits in each of the N rounds of sorting processes, the K is an odd number or even number between (N−1) and one, and when the K is equal to one, the $(K-1)^{th}$-round sort result is the N numbers in the initial order. The plurality of duplicating circuits are configured to output the $K^{th}$-round highest ranking number as the $(K+1)^{th}$-round highest ranking number of the $(K+1)^{th}$-round sort result and output the $K^{th}$-round lowest ranking number as the $(K+1)^{th}$-round lowest ranking number of the $(K+1)^{th}$-round sort result.

A further embodiment of the sorting device of the present disclosure is operable to continuously perform N rounds of sorting processes from a first round sorting process to an $N^{th}$ round sorting process in turn to sort N numbers that are in an initial order and thereby obtain N-rounds sort results from a first-round sort result to an $N^{th}$-round sort result in turn, wherein at least two pairs of numbers of the N numbers are sorted concurrently in each of the N rounds of sorting process and the N is an odd integer greater than two. This embodiment includes a plurality of sorting circuits and a plurality of duplicating circuits. The plurality of sorting $$\frac{N-1}{2}$$

circuits are configured to sort sets of numbers of the N numbers exclusive of a first number according to a $(K-1)^{th}$-round sort result of the N-rounds sort results in a $K^{th}$ round sorting process of the N rounds of sorting processes and thereby obtain a $K^{th}$-round sort result of the N-rounds sort results without the first number; and the plurality of sorting circuits are $$\frac{S-1}{2}$$

further configured to sort sets of numbers of the IN numbers exclusive of a second number according to the $K^{th}$-round sort result in a $(K+1)^{th}$ round sorting process of the N rounds of sorting processes and thereby obtain a $(K+1)^{th}$-round sort result of the N-rounds sort results $$\frac{N-1}{2}$$

without the second number, wherein the S is equal to the N, each set of the sets of numbers $$\frac{S-1}{2}$$

and the sets of numbers includes two of the N numbers, numbers sorted by one of the plurality of sorting circuits are different from numbers sorted by any other one of the plurality of sorting circuits in each of the N rounds of sorting processes, the K is an odd number or even number between (N−1) and one, and when the K is equal to one, the $(K-1)^{th}$-round sort result is the N numbers in the initial order. The plurality of duplicating circuits are configured to output the first number as one of a $K^{th}$-round highest ranking number and a $K^h$-round lowest ranking number of the $K^{th}$-round sort result, and output the second number as one of a $(K+1)^{th}$-round highest ranking number and a $(K+1)^{th}$-round lowest ranking number of the $(K+1)^{th}$-round sort result, wherein when the first number is outputted as the $K^{th}$-round highest ranking number, the second number is the $K^{th}$-round lowest ranking number and outputted as the $(K+1)^{th}$-round lowest ranking number, and when the first number is outputted as the $K^{th}$-round lowest ranking number, the second number is the $K^{th}$-round highest ranking number and outputted as the $(K+1)^{th}$-round highest ranking number.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

Figure 1:
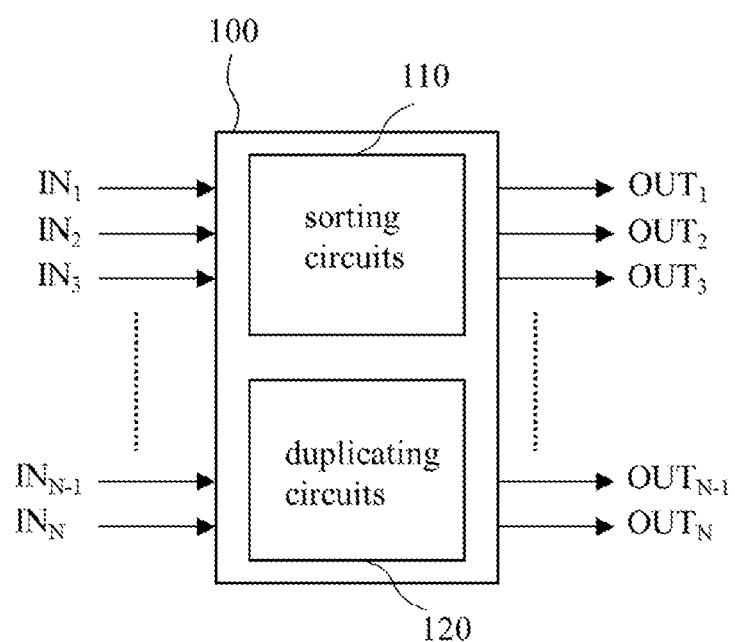
FIG. 1 shows an embodiment of the sorting device of the present disclosure.

FIG. 1 shows an embodiment of the sorting device of the present disclosure. The sorting device 100 of FIG. 1 is configured to continuously perform N rounds of sorting processes from a first round sorting process to an $N^{th}$ round sorting process in turn to sort N numbers (e.g., $IN_1$~$IN_N$ of FIG. 1) that are in an initial order and thereby obtain N-rounds sort results from a first-round sort result to an $N^{th}$-round sort result in turn, wherein at least two pairs of numbers of the N numbers are sorted concurrently in each of the N rounds of sorting process, the $N^{th}$-round sort result (e.g., $OUT_1$~$OUT_N$ of FIG. 1) is the collating sequence of the N numbers (i.e., the N numbers in their descending/ascending order), and the N is an integer greater than two. In brief, the sorting device 100 can perform at most the N rounds of sorting processes to obtain the collating sequence of the N number while the Bubble Sort of the prior art should execute $$\frac{N \times (N-1)}{2}$$

rounds of sorting processes to obtain the collating sequence of the N numbers.

Please refer to FIG. 1. The sorting device 100 includes X sorting circuits 110 and Y duplicating circuit(s) 120. Each of the X sorting circuits 110 is configured to sort two numbers of the aforementioned N numbers and thereby obtain the collating sequence of the two numbers, wherein the X is an integer equal to or greater than $$\frac{N}{2}.$$

Figure 2:
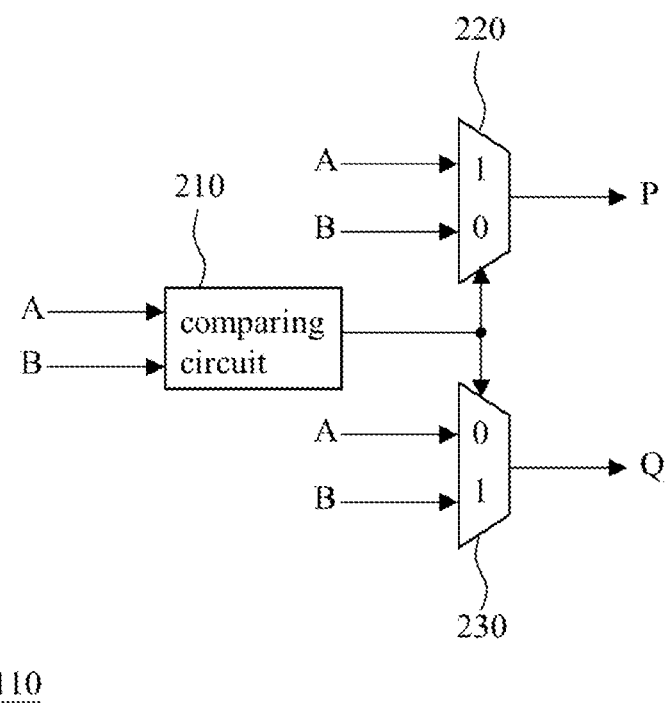
FIG. 2 shows an embodiment of each sorting circuit of FIG. 1.

Each of the Y duplicating circuit(s) 120 is configured to receive an input number and output it as an output number, wherein the Y is an integer equal to or greater than one. FIG. 2 shows an embodiment of each sorting circuit 110 including: a comparing circuit 210 configured to determine whether a number "A" is greater than or equal to a number "B" (i.e., to determine whether A≥B) and thereby generate a comparison result (e.g., "1" if A≥B, or "0" if A<B); a first selecting circuit 220 configured to output the larger one among the two numbers A, B as the output number "P" in accordance with the comparison result if A>B or A<B, or output one/any of the two numbers A, B (e.g., A) as the output number P if A=B; and a second selecting circuit 230 configured to output the smaller one among the two numbers A, B as the output number "Q" if A>B or A<B, or output one/any of the two numbers A, B (e.g., B) as the output number Q if A=B. In an alternative embodiment, the comparing circuit 210 of FIG. 2 is configured to determine whether the number A is greater than the number B (i.e., to determine whether A>B) and thereby generate a comparison result (e.g., "1" if A>B, or "0" if A≤B); the first selecting circuit 220 of FIG. 2 is configured to output the smaller one among the two numbers A, B as the output number P in accordance with the comparison result if A>B or A<B, or output one/any of the two numbers A, B (e.g., A) as the output number P if A=B; and the second selecting circuit 230 of FIG. 2 is configured to output the larger one among the two numbers A, B as the output number Q in accordance with the comparison result if A>B or A<B, or output one/any of the two numbers A, B (e.g., B) as the output number Q if A=B. In addition, an embodiment of each duplicating circuit 120 includes a transmission wire or the like capable of outputting the signal it received as the input for a subsequent circuit.

Figure 3:
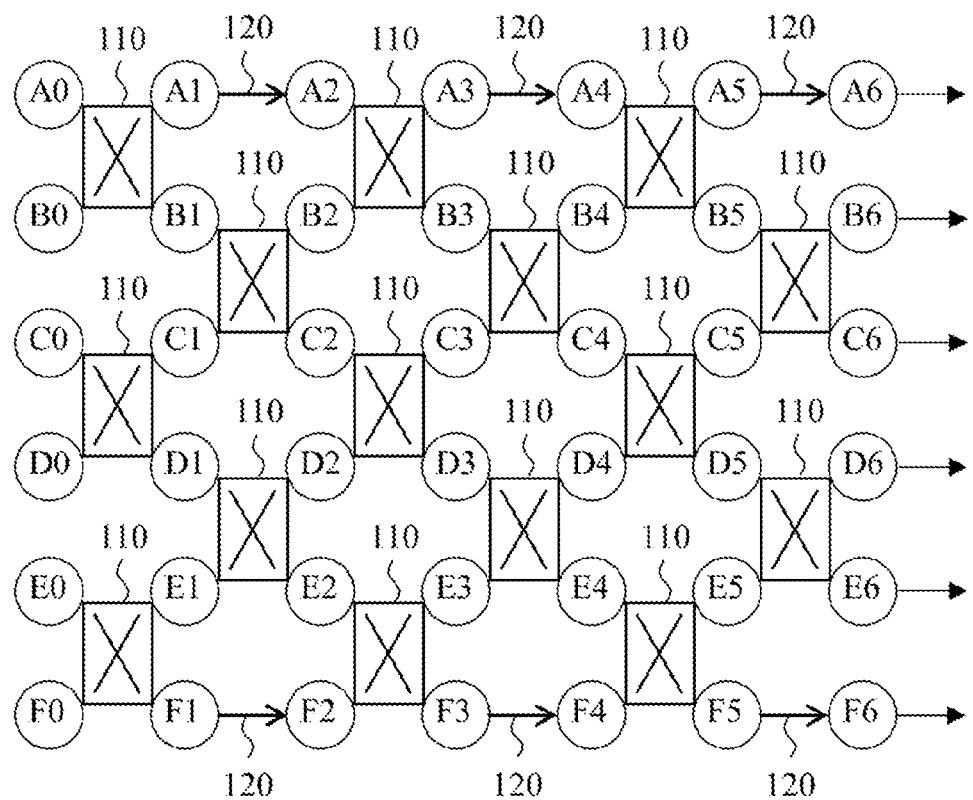
FIG. 3 illustrates how the sorting device of FIG. 1 sorts $2^T$ numbers (T: positive integer) in an exemplary implementation.

FIG. 3 illustrates how the sorting device 100 of FIG. 1 sorts $2^T$ numbers (e.g., the six numbers A0~F0 of FIG. 3) in an exemplary implementation, wherein the superscript "T" is a positive integer (e.g., an integer greater than one), each symbol "⊠" denotes a sorting circuit 110 performing sorting operation, and each symbol "→" denotes a duplicating circuit 120 performing duplicating operation. It should be noted that all the sorting circuits 110 in FIG. 3 used in the same round of the N rounds of sorting processes are different from one another/each other, and all the duplicating circuits 120 in FIG. 3 used in the same round of the N rounds of sorting processes are different from one another/each other; in other words, a pair of numbers sorted by one sorting circuit 110 are different from a pair of numbers sorted by any other sorting circuit 110 in the same round of the N rounds of sorting processes, and a number reproduced by one duplicating circuit 120 is different from a number reproduced by any other duplicating circuit 120 in the same round of the N rounds of sorting processes. As shown in FIG. 3, three sorting circuits 110 are used to sort a first pair of numbers (A0, B0), a second pair of numbers (C0, D0), and a third pair of numbers (E0, F0) respectively in the first round sorting process, wherein the larger one and smaller one of the first pair of numbers are outputted as A1 and B1 respectively (A1≥B1), the larger one and smaller one of the second pair of numbers are outputted as C1 and D1 respectively (C1≥D1), the larger one and smaller one of the third pair of numbers are outputted as E1 and F1 respectively (E1≥F1), and thus the first-round sort result is A1, B1, C1, D1, E1, and F1 (i.e., A1~F1). Similarly, two sorting circuits 110 are used to sort a first pair of numbers (B1, C1) and a second pair of numbers (D1, E1) respectively in the second round sorting process, wherein the larger one and smaller one of the first pair of numbers are outputted as B2 and C2 respectively (B2≥C2), and the larger one and smaller one of the second pair of numbers are outputted as D2 and E2 respectively (D2≥E2); besides, two duplicating circuits 120 are used to output the first-round highest ranking number A1 and the first-round lowest ranking number F1 as the second-round highest ranking number A2 (A2=A1) and the second-round lowest ranking number F2 (F2=F1) respectively; accordingly, the second-round sort result is A2, B2, C2, D2, E2, and F2 (i.e., A2~F2). The other sorting processes and sort results can be derived from the above description in view of FIG. 3.

Figure 4:
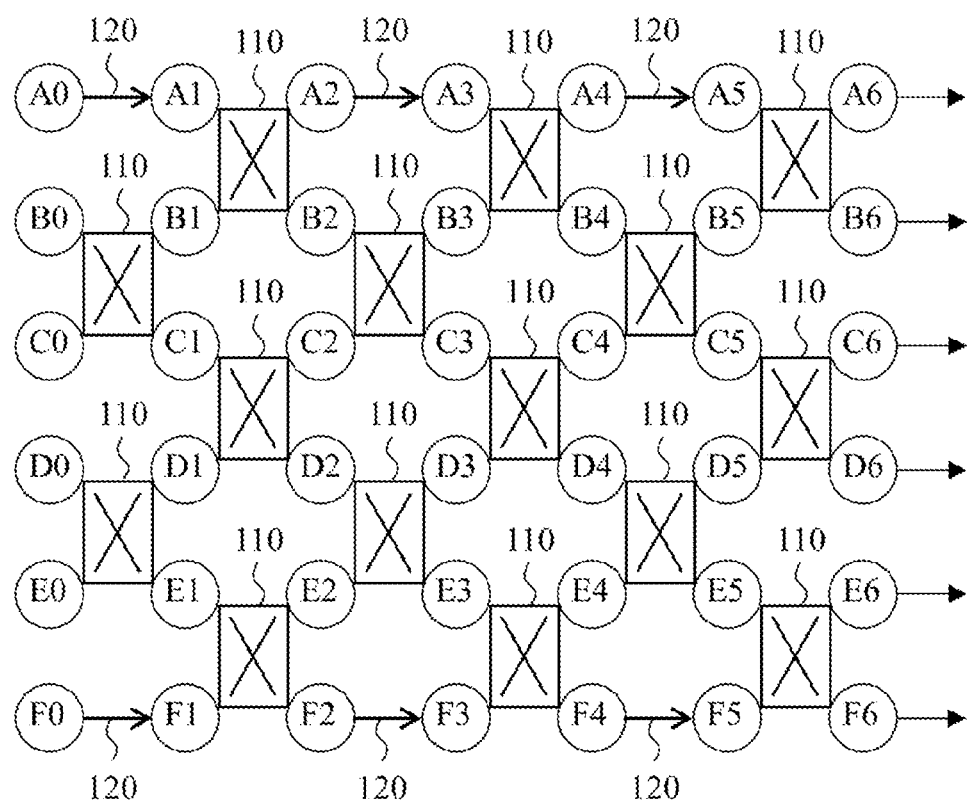
FIG. 4 illustrates how the sorting device of FIG. 1 sorts $2^T$ numbers in another exemplary implementation.

FIG. 4 illustrates how the sorting device 100 of FIG. 1 sorts $2^T$ numbers (e.g., the six numbers A0~F0 of FIG. 4) in an exemplary implementation. As shown in FIG. 4, two sorting circuits 110 are used to sort a first pair of numbers (B0, C0) and a second pair of numbers (D0, E0) respectively in the first round sorting process, wherein the larger one and smaller one of the first pair of numbers are outputted as B1 and C1 respectively (B1≥C1), the larger one and smaller one of the second pair of numbers are outputted as D1 and E1 respectively (D1≥E1), two duplicating circuits 120 are used to output the highest ranking number A0 and the lowest ranking number F0 of the six numbers A0~F0 as the first-round highest ranking number A1 (A1=A0) and the first-round lowest ranking number F1 (F1=F0) respectively, and thus the first-round sort result is A1~F1. Similarly, three sorting circuits 110 are used to sort a first pair of numbers (A1, B1), a second pair of numbers (C1, D1), and a third pair of numbers (E1, F1) respectively in the second round sorting process, wherein the larger one and smaller one of the first pair of numbers are outputted as A2 and B2 respectively (A2≥B2), the larger one and smaller one of the second pair of numbers are outputted as C2 and D2 respectively (C2≥D2), and the larger one and smaller one of the third pair of numbers are outputted as E2 and F2 respectively (E2≥F2) respectively; accordingly, the second-round sort result is A2~F2. The other sorting processes and sort results can be derived from the above description in view of FIG. 4.

Figure 5:
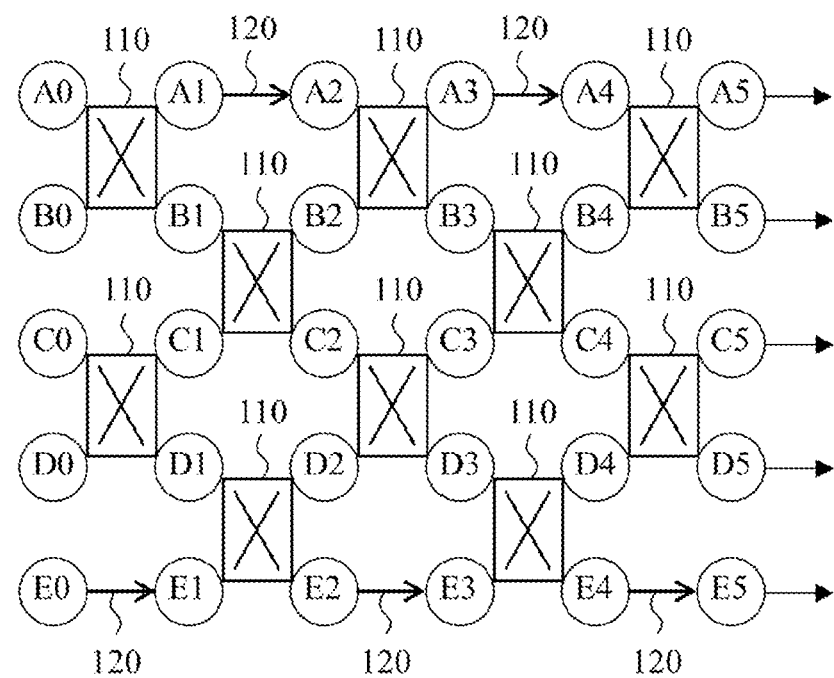
FIG. 5 illustrates how the sorting device of FIG. 1 sorts $(2^T-1)$ numbers in an exemplary implementation.

FIG. 5 illustrates how the sorting device 100 of FIG. 1 sorts $(2^T-1)$ numbers (e.g., the five numbers A0~E0 of FIG. 5) in an exemplary implementation, wherein the superscript "T" is a positive integer, each symbol "⊠" denotes a sorting circuit 110 performing sorting operation, and each symbol "→" denotes a duplicating circuit 120 performing duplicating operation. It should be noted that all the sorting circuits 110 in FIG. 5 used in the same round of the N rounds of sorting processes are different from one another/each other. As shown in FIG. 5, two sorting circuits 110 are used to sort a first pair of numbers (A0, B0) and a second pair of numbers (C0, D0) respectively in the first round sorting process, wherein the larger one and smaller one of the first pair of numbers are outputted as A1 and B1 respectively (A1≥B1), the larger one and smaller one of the second pair of numbers are outputted as C1 and D1 respectively (C1≥D1), one duplicating circuits 120 is used to output the lowest ranking number E0 of the five numbers A0~E0 as the first-round lowest ranking number E1 (E1=E0), and thus the first-round sort result is A1~E1. Similarly, two sorting circuits 110 are used to sort a first pair of numbers (B1, C1) and a second pair of numbers (D1, E1) respectively in the second round sorting process, wherein the larger one and smaller one of the first pair of numbers are outputted as B2 and C2 respectively (B2≥C2), the larger one and smaller one of the second pair of numbers are outputted as D2 and E2 respectively (D2≥E2), one duplicating circuits 120 is used to output the first-round highest ranking number A1 as the second-round highest ranking number A2 (A2=A1), and thus the second-round sort result is A2~E2. The other sorting processes and sort results can be derived from the above description in view of FIG. 5.

Figure 6:
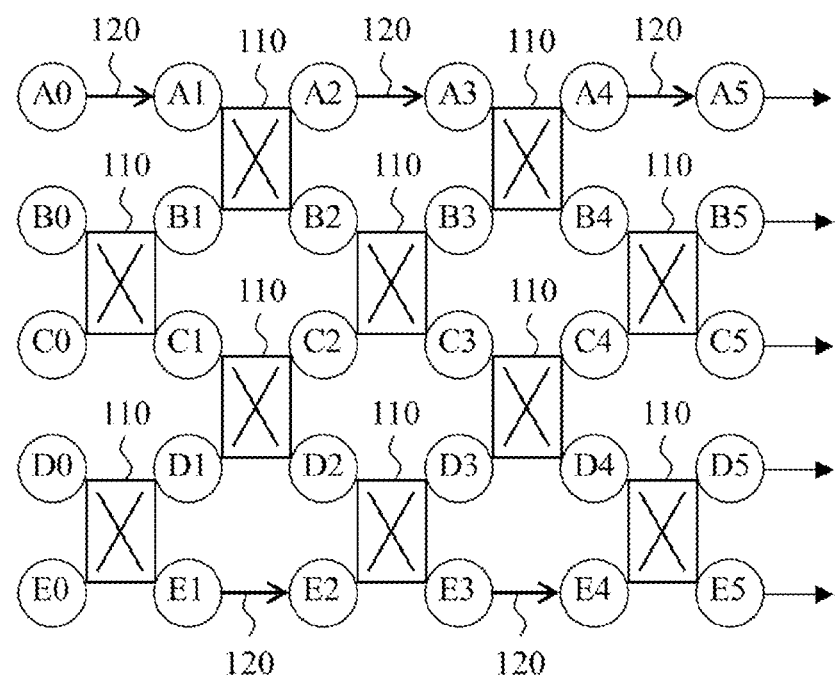
FIG. 6 illustrates how the sorting device of FIG. 1 sorts $(2^T-1)$ numbers in another exemplary implementation.

FIG. 6 illustrates how the sorting device 100 of FIG. 1 sorts $(2^T-1)$ numbers (e.g., the five numbers A0~E0 of FIG. 6) in an exemplary implementation. As shown in FIG. 6, two sorting circuits 110 are used to sort a first pair of numbers (B0, C0) and a second pair of numbers (D0, E0) respectively in the first round sorting process, wherein the larger one and smaller one of the first pair of numbers are outputted as B1 and C1 respectively (B1≥C1), the larger one and smaller one of the second pair of numbers are outputted as D1 and E1 respectively (D1≥E1), one duplicating circuits 120 is used to output the highest ranking number A0 of the five numbers A0~E0 as the first-round highest ranking number A1 (A1=A0), and thus the first-round sort result is A1~E1. Similarly, two sorting circuits 110 are used to sort a first pair of numbers (A1, B1) and a second pair of numbers (C1, D1) respectively in the second round sorting process, wherein the larger one and smaller one of the first pair of numbers are outputted as A2 and B2 respectively (A2≥B2), the larger one and smaller one of the second pair of numbers are outputted as C2 and D2 respectively (C2≥D2), one duplicating circuits 120 is used to output the first-round lowest ranking number E1 as the second-round lowest ranking number E2 (E2=E1), and thus the second-round sort result is A2~E2. The other sorting processes and sort results can be derived from the above description in view of FIG. 6.

It should be noted that the aforementioned N-rounds sort results include a $(K-1)^{th}$-round sort result, a $K^{th}$-round sort result, and a $(K+1)^{th}$-round sort result; the K is an odd number or even number between (N−1) and one; when the K is equal to one, the $(K-1)^{th}$-round sort result is the N numbers in the initial order. In a circumstance that the $K^{th}$-round sort result is equal to the $(K-1)^{th}$-round sort result and the $(K+1)^{th}$-round sort result is equal to the $K^{th}$-round sort result (i.e., three consecutive sort results are the same), the sorting device 100 can optionally terminate the N rounds of sorting processes and outputs the $(K+1)^{th}$-round sort result as the $N^{th}$-round sort result (i.e., the final sort result) to save time.

Figure 7:
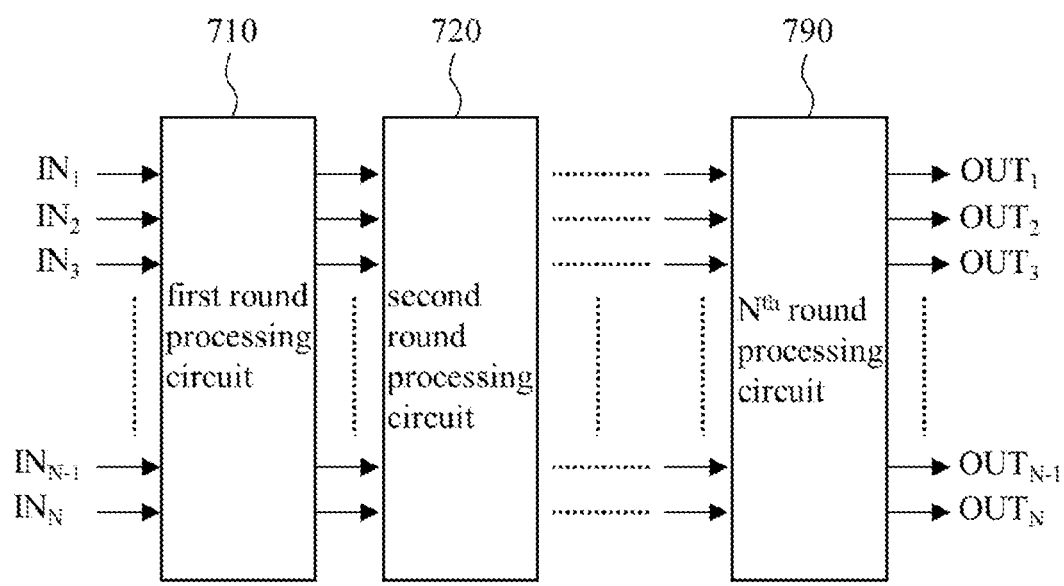
FIG. 7 shows an exemplary implementation of the sorting device of FIG. 1.

FIG. 7 shows an exemplary implementation of the sorting device 100 of FIG. 1. As shown in FIG. 7, the sorting device 100 includes a first round processing circuit 710, a second round processing circuit 720, . . . , and an $N^{th}$ round processing circuit 790 that are in a pipeline configuration and respectively used to perform the first round sorting process, the second round sorting process, . . . , and the $N^{th}$ round sorting process to sort the N numbers. An embodiment of the first round processing circuit 710 is composed of the three sorting circuits 110 of FIG. 3 used in the first round sorting process; another embodiment of the first round processing circuit 710 is composed of the two sorting circuits 110 and the two duplicating circuits 120 of FIG. 4 used in the first round sorting process; yet another embodiment of the first round processing circuit 710 is composed of the two sorting circuits 110 and the one duplicating circuit 120 of FIG. 5 used in the first round sorting process; a further embodiment of the first round processing circuit 710 is composed of the two sorting circuits 110 and the one duplicating circuit 120 of FIG. 6 used in the first round sorting process. An embodiment of the second round processing circuit 720 is composed of the two sorting circuits 110 and the two duplicating circuits 120 of FIG. 3 used in the second round sorting process; another embodiment of the second round processing circuit 720 is composed of the three sorting circuits 110 of FIG. 4 used in the second round sorting process; yet another embodiment of the second round processing circuit 720 is composed of the two sorting circuits 110 and the one duplicating circuit 120 of FIG. 5 used in the second round sorting process; a further embodiment of the second round processing circuit 720 is composed of the two sorting circuits 110 and the one duplicating circuit 120 of FIG. 6 used in the second round sorting process. Embodiments of the other processing circuits of FIG. 7 can be derived from the above description in view of FIGS. 3-6. It should be noted that people of ordinary skill in the art can appreciate that one or more clock signals can be supplied to each processing circuit of FIG. 7 and one or more storage circuits (e.g., each of which includes N registers such as N D-type flip-flops) can be used to store some or all of the N-rounds sort results according to the demand for implementation; since the utilization of clock signals and storage circuits are known in this technical field, their detail is omitted here.

Figure 8:
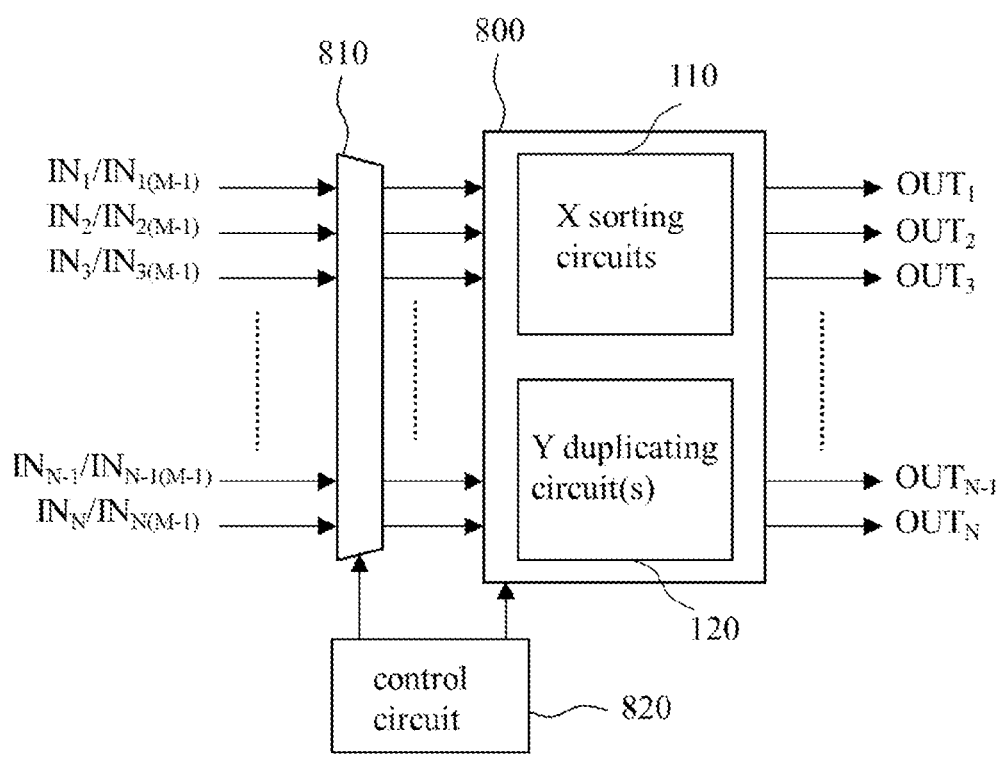
FIG. 8 shows another exemplary implementation of the sorting device of FIG. 1.

FIG. 8 shows another exemplary implementation of the sorting device 100 of FIG. 1. As shown in FIG. 8, the sorting device 100 not only includes a processing circuit 800 composed of X sorting circuits 110 and Y duplicating circuit(s) 120 but also includes a selecting circuit 810 and a control circuit 820, wherein the X is an integer greater than one and the Y is a positive integer. The selecting circuit 810 is configured to output the N numbers (e.g., $IN_1 \sim IN_N$) in the initial order to the processing circuit 800 in the first round sorting process, and to output a $(M-1)^{th}$-round sort result (e.g., $IN_{1(M-1)} \sim IN_{N(M-1)}$) it received to the processing circuit 800 in an $M^{th}$ round sorting process (i.e., any of the sorting processes from the second round sorting process to the $N^{th}$ round sorting process) of the N rounds of sorting processes, wherein the M is an integer between two and the N. The control circuit 820 is configured to control the selecting circuit 810 to let it output the N numbers in the initial order or output the $(M-1)^{th}$-round sort result. An embodiment of the control circuit 820 includes a counter configured to count in turn and output a count number to the selecting circuit 810, the X sorting circuits 110, and the Y duplicating circuit(s) 120. In a circumstance that the count number is an initial number (e.g., zero), the selecting circuit 810 outputs the N numbers in the initial order to the processing circuit 800 which then generates the first-round sort result accordingly; in a circumstance that the count number (e.g., any number between one and (N−1)) is not the initial number, the selecting circuit 810 outputs the (M−1)$^{th}$-round sort result to the processing circuit 800 which then generates the $M^{th}$-round sort result accordingly. In addition, in a circumstance that the count number is an odd number exclusive of the initial number, a first group of sorting circuits (e.g., the sorting circuits 912 of FIG. 9 or sorting circuits 914 of FIG. 10) among the X sorting circuits 110 is enabled to perform sorting operation of the N rounds of sorting processes while a second group of sorting circuits (e.g., the sorting circuits 914 of FIG. 9 or sorting circuits 912 of FIG. 10) among the X sorting circuits 110 is disabled or idled, wherein the second group of sorting circuits is different from the first group of sorting circuits. On the other hand, in a circumstance that the count number is an even number exclusive of the initial number, the first group of sorting circuits is disabled or idled while the second group of sorting circuits is enabled to perform the sorting operation. Furthermore, in a circumstance that the count number is not the initial number, at least one duplicating circuit (e.g., the duplicating circuits 922, 924 of FIG. 9 or the duplicating circuit 922/924 of FIG. 10) performs duplicating operation of the N rounds of sorting processes and cooperates with the first/second group of sorting circuits. It should be noted that if the count number is not the initial number, the output of the processing circuit 800 (i.e., the $(M-1)^{th}$-round sort result) is used as the input of the selecting circuit 810. In order to prevent the drawings of FIGS. 8-10 from being complicated, the connections and/or the buffer circuits between the output terminals of the processing circuit 800 and the input terminals of the selecting circuit 810 are not shown; however, this omission has little to do with the understanding of the sorting device 100 of the present disclosure.

Figure 9:
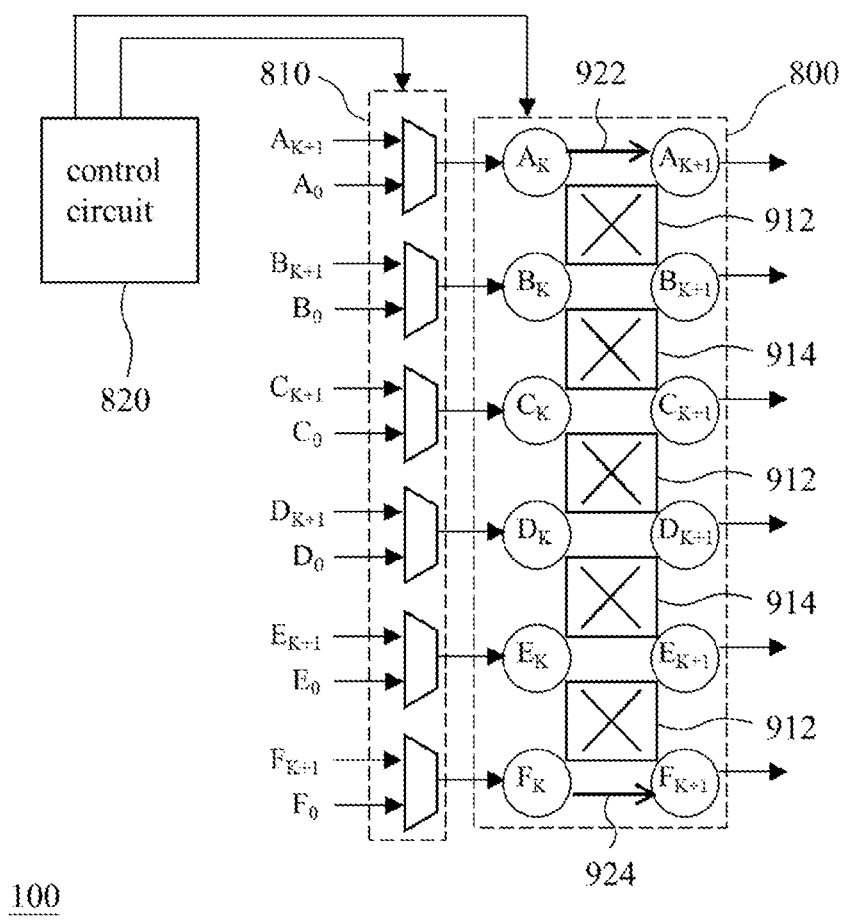
FIG. 9 illustrates how the sorting device of FIG. 8 sorts $2^T$ numbers in an exemplary implementation.

FIG. 9 illustrates how the sorting device 100 of FIG. 8 sorts $2^T$ numbers (e.g., the six numbers A0~F0 of FIG. 9) in an exemplary implementation. As shown in FIGS. 8~9, under the control of the control circuit 820, the selecting circuit 810 receives the six numbers A~F0 and outputs them as the input numbers $A_K \sim F_K$ for the first round sorting process; after that, three sorting circuits 912 of the X sorting circuits 110 are enabled to sort three pairs of numbers (($A_K$, $B_K$), ($C_K$, $D_K$),($E_K$, $F_K$)) respectively, and two sorting circuits 914 of the X sorting circuits 110 and two duplicating circuits 922, 924 of the Y duplicating circuits 120 are disabled or idled, wherein the larger one and smaller one of the first pair of numbers ($A_K$, $B_K$) are outputted as $A_{K+1}$ and $B_{K+1}$ respectively ($A_{K+1} \geq B_{K+1}$), the larger one and smaller one of the second pair of numbers ($C_K$, $D_K$) are outputted as $C_{K+1}$ and $D_{K+1}$ respectively ($C_{K+1} \geq D_{K+1}$), the larger one and smaller one of the third pair of numbers ($E_K$, $F_K$) are outputted as $E_{K+1}$ and $F_{K+1}$ respectively ($E_{K+1} \geq F_{K+1}$), and therefore the first-round sort result is $A_{K+1} \sim F_{K+1}$. Next, the selecting circuit 810 receives the first-round sort result $A_{K+1} \sim F_{K+1}$ and outputs them as the input numbers $A_K \sim F_K$ for the second round sorting process; afterwards, the duplicating circuit 922 outputs the input number $A_K$ (i.e., the first-round highest ranking number $A_{K+1}$) as the second-round highest ranking number $A_{K+1}$ ($A_{K+1} = A_K$), the duplicating circuit 924 outputs the input number $F_K$ (i.e., the first-round lowest ranking number $F_{K+1}$) as the second-round lowest ranking number $F_{K+1}$ ($F_{K+1} = F_K$) two sorting circuits 914 are enabled to sort two pairs of numbers (($B_K$, $C_K$) ($D_K$, $E_K$)) respectively, and three sorting circuits 912 are disabled or idled, wherein the larger one and smaller one of the first pair of numbers ($B_K$, $C_K$) are outputted as $B_{K+1}$ and $C_{K+1}$ respectively ($B_{K+1} \geq C_{K+1}$), the larger one and smaller one of the second pair of numbers ($D_K$, $E_K$) are outputted as $D_{K+1}$ and $E_{K+1}$ respectively ($D_{K+1} \geq E_{K+1}$), and therefore the second-round sort result is $A_{K+1} \sim F_{K+1}$. The other sorting processes and sort results of FIG. 9 can be derived from the above description in view of FIG. 9. It should be noted that the sorting circuits 912 and sorting circuits 914 will not be used simultaneously, and thus a Time-Division Multiplexing (TDM) technique can be used to omit the sorting circuit 914; in detail, R sorting circuits 912 can take the place of R sorting circuits 914 through common enablement control and signal input/output selection and switch, and thus $$\frac{N}{2}$$

sorting circuits (i.e., $$X \text{ sorting circuits} = \frac{N}{2}$$

sorting circuits) will be enough for implementation, wherein R is a positive integer. Similarly, the duplicating circuit 922 and duplicating circuit 924 of FIG. 10 will not be used simultaneously, and thus the duplicating circuit 922 can take the place of the duplicating circuit 924 with a TDM technique to omit the duplicating circuit 924; in the above circumstance one duplicating circuit (i.e., Y duplicating circuit(s)=one duplicating circuit) will be enough for implementation. Since the above-mentioned TDM technique (i.e., a technique using time-dependent enablement control and signal input/output selection and switch) is known in this technical field, the detail is omitted here. It should be noted that the embodiment of FIG. 7 may adopt a TDM technique as long as it is practicable.

Figure 10:
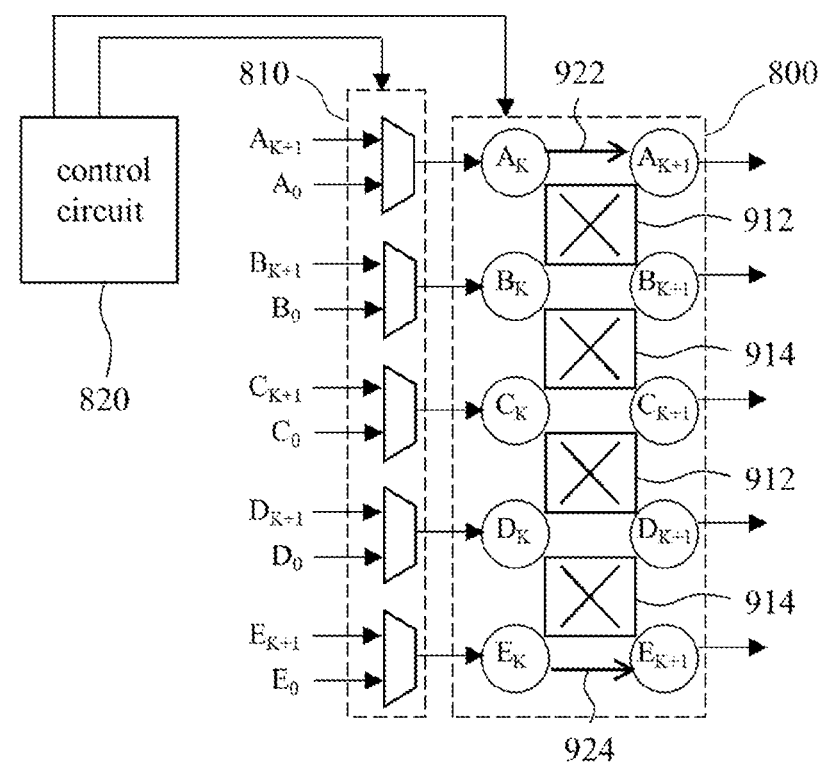
FIG. 10 illustrates how the sorting device of FIG. 8 sorts $(2^T-1)$ numbers in another exemplary implementation.

FIG. 10 illustrates how the sorting device 100 of FIG. 8 sorts ($2^T - 1$) numbers (e.g., the five numbers A0~E0 of FIG. 10) in an exemplary implementation. Since those of ordinary skill in the art can appreciate the detail and modifications of FIG. 10 by referring to the disclosure of the other embodiments, repeated and redundant description is omitted here.

It should be noted that people of ordinary skill in the art can implement the present invention by selectively using some or all of the features of any embodiment in this specification or selectively using some or all of the features of multiple embodiments in this specification as long as such implementation is practicable, which implies that the present invention can be carried out flexibly. For instance, the processing circuit 800 of FIG. 8 can be composed of a plurality of processing circuits of FIG. 7 (e.g., $$\frac{N}{2}$$

processing circuits of FIG. 7) so that the folding configuration of FIG. 8 can incorporate at least a part of the pipeline configuration of FIG. 7; for another instance, any processing circuit of FIG. 7 can be composed of circuits of FIG. 8 (e.g., circuits of FIG. 9 or FIG. 10) so that the pipeline configuration of FIG. 7 can incorporate the folding configuration of FIG. 8.

To sum up, the sorting device of the present disclosure is capable of parallel computing and the structure of the sorting device is not complicated.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A sorting device configured to continuously perform N rounds of sorting processes from a first round sorting process to an $N^{th}$ round sorting process in turn to sort N numbers that are in an initial order and thereby obtain N-rounds sort results from a first-round sort result to an $N^{th}$-round sort result in turn, wherein at least two pairs of numbers of the N numbers are sorted concurrently in each of the N rounds of sorting processes, the N is an even integer equal to or greater than six, and the sorting device comprises:

a processing circuit including:

a plurality of sorting circuits configured to perform parallel computing to sort $$\frac{N}{2}$$

sets of numbers of the N numbers according to a $(K-1)^{th}$-round sort result of the N-rounds sort results and thereby obtain a $K^{th}$-round sort result of the N-rounds sort results including a $K^{th}$-round highest ranking number and a $K^{th}$-round lowest ranking number, and the plurality of sorting circuits further configured to perform the parallel computing to sort $$\frac{N-2}{2}$$

sets of numbers of the N numbers exclusive of the $K^{th}$-round highest ranking number and the $K^{th}$-round lowest ranking number according to the $K^{th}$-round sort result and thereby obtain a $(K+1)^{th}$-round sort result of the N-rounds sort results without a $(K+1)^{th}$-round highest ranking number and a $(K+1)^{th}$-round lowest ranking number, wherein a total number of the sorting circuits is an integer equal to or greater than three and is not less than $$\frac{N}{2},$$

at least $$\frac{N-2}{2}$$

sorting circuits of the plurality of sorting circuits concurrently sort at least (N−2) numbers of the N numbers for the parallel computing in each of the N rounds of sorting processes, each set of the $$\frac{N}{2}$$

sets of numbers and the $$\frac{N-2}{2}$$

sets of numbers includes two number of the N numbers, numbers sorted by one of the plurality of sorting circuits are different from numbers sorted by any other one of the plurality of sorting circuits in each of the N rounds of sorting processes, the K is an odd number or even number between (N−1) and one, and when the K is equal to one, the $(K-1)^{th}$-round sort result is the N numbers in the initial order; and a plurality of duplicating circuits configured to output the $K^{th}$-round highest ranking number as the $(K+1)^{th}$-round highest ranking number of the $(K+1)^{th}$-round sort result and output the $K^{th}$-round lowest ranking number as the $(K+1)^{th}$-round lowest ranking number of the $(K+1)^{th}$-round sort result, wherein a total number of the duplicating circuit(s) is equal to or greater than two;

a selecting circuit configured to output the N numbers in the initial order to the processing circuit in the first round sorting process and configured to output an $(M-1)^{th}$-round sort result of the N-rounds sort results to the processing circuit in an $M^{th}$ round sorting process of the N rounds of sorting processes, wherein the M is an integer between the N and two; and a control circuit including a counter configured to output a count number to control the selecting circuit and the processing circuit, wherein when the count number is an initial number, the selecting circuit outputs the N numbers in the initial order to the processing circuit which then generates the first-round sort result accordingly; when the count number is not the initial number, the selecting circuit outputs the $(M-1)^{th}$-round sort result to the processing circuit which then generates an $M^{th}$-round sort result of the N-rounds sort results accordingly; when the count number is an odd number exclusive of the initial number, a first group of sorting circuits among the plurality of sorting circuits is enabled to perform a sorting operation while a second group of sorting circuits among the plurality of sorting circuits is disabled or idled; when the count number is an even number exclusive of the initial number, the first group of sorting circuits is disabled or idled while the second group of sorting circuits is enabled to perform the sorting operation; and when the count number is not the initial number, at least one of the plurality of duplicating circuits is enabled to perform a duplicating operation.

2. The sorting device of claim 1, wherein each of the sorting circuits includes:

a comparing circuit configured to compare two numbers of the N numbers and thereby generate a comparison result;

a first selecting circuit configured to output a first number among the two numbers according to the comparison result; and a second selecting circuit configured to output a second number among the two numbers according to the comparison result, wherein in a circumstance that the two numbers differ from each other, the first number is one of a larger number and a smaller number of the two numbers and the second number is the other one of the larger number and the smaller number.

3. The sorting device of claim 1, wherein in a circumstance that the $K^{th}$-round sort result is equal to the $(K-1)^{th}$-round sort result and the $(K+1)^{th}$-round sort result is equal to the $K^{th}$-round sort result, the sorting device terminates the N rounds of sorting processes and outputs the $(K+1)^{th}$-round sort result as the $N^{th}$-round sort result.

4. A sorting device configured to continuously perform N rounds of sorting processes from a first round sorting process to an $N^{th}$ round sorting process in turn to sort N numbers that are in an initial order and thereby obtain N-rounds sort results from a first-round sort result to an $N^{th}$-round sort result in turn, wherein at least two pairs of numbers of the N numbers are sorted concurrently in each of the N rounds of sorting processes, the N is an odd integer equal to or greater than five, and the sorting device comprises:

a processing circuit including:

a plurality of sorting circuits configured to perform parallel computing to sort $$\frac{N-1}{2}$$

sets of numbers of the N numbers exclusive of a first number according to a $(K-1)^{th}$-round sort result of the N-rounds sort results in a $K^{th}$ round sorting process of the N rounds of sorting processes and thereby obtain a $K^{th}$-round sort result of the N-rounds sort results without the first number, and the plurality of sorting circuits further configured to perform the parallel computing to sort $$\frac{S-1}{2}$$

sets or numbers of the N numbers exclusive of a second number according to the $K^{th}$-round sort result in a $(K+1)^{th}$ round sorting process of the N rounds of sorting processes and thereby obtain a $(K+1)^{th}$-round sort result of the N-rounds sort results without the second number, wherein a total number of the sorting circuits is an integer equal to or greater than two and is not less than $$\frac{N-1}{2},$$

at least $$\frac{N-1}{2}$$

sorting circuits of the plurality of sorting circuits concurrently sort at least (N−1) numbers of the N numbers for the parallel computing in each of the N rounds of sorting processes, the S is equal to the N, each set of the $$\frac{N-1}{2}$$

sets of numbers and the $$\frac{S-1}{2}$$

sets of numbers includes two of the N numbers, numbers sorted by one of the plurality of sorting circuits are different from numbers sorted by any other one of the plurality of sorting circuits in each of the N rounds of sorting processes, the K is an odd number or even number between (N−1) and one, and when the K is equal to one, the $(K-1)^{th}$-round sort result is the N numbers in the initial order; and a plurality of duplicating circuits configured to output the first number as one of a $K^{th}$-round highest ranking number and a $K^{th}$-round lowest ranking number of the $K^{th}$-round sort result, and to output the second number as one of a $(K+1)^{th}$-round highest ranking number and a $(K+1)^{th}$-round lowest ranking number of the $(K+1)^{th}$-round sort result, wherein when the first number is outputted as the $K^{th}$-round highest ranking number, the second number is the $K^{th}$-round lowest ranking number and outputted as the $(K+1)^{th}$-round lowest ranking number, and when the first number is outputted as the $K^{th}$-round lowest ranking number, the second number is the $K^{th}$-round highest ranking number and outputted as the $(K+1)^{th}$-round highest ranking number;

a selecting circuit configured to output the N numbers in the initial order to the processing circuit in the first round sorting process and configured to output an $(M-1)^{th}$-round sort result of the N-rounds sort results to the processing circuit in an $M^{th}$ round sorting process of the N rounds of sorting processes, wherein the M is an integer between the N and two; and a control circuit including a counter configured to output a count number to control the selecting circuit and the processing circuit, wherein when the count number is an initial number, the selecting circuit outputs the N numbers in the initial order to the processing circuit which then generates the first-round sort result accordingly; when the count number is not the initial number, the selecting circuit outputs the $(M-1)^{th}$-round sort result to the processing circuit which then generates an $M^{th}$-round sort result of the N-rounds sort results accordingly; when the count number is an odd number exclusive of the initial number, a first group of sorting circuits among the plurality of sorting circuits is enabled to perform a sorting operation while a second group of sorting circuits among the plurality of sorting circuits is disabled or idled; when the count number is an even number exclusive of the initial number, the first group of sorting circuits is disabled or idled while the second group of sorting circuits is enabled to perform the sorting operation; and when the count number is not the initial number, at least one of the plurality of duplicating circuits is enabled to perform a duplicating operation.

5. The sorting device of claim 4, wherein each of the sorting circuits includes:

a comparing circuit configured to compare two numbers of the N numbers and thereby generate a comparison result;

a first selecting circuit configured to output a first number among the two numbers according to the comparison result; and a second selecting circuit configured to output a second number among the two numbers according to the comparison result, wherein in a circumstance that the two numbers differ from each other, the first number is one of a larger number and a smaller number of the two numbers and the second number is the other one of the larger number and the smaller number.

6. The sorting device of claim 4, wherein in a circumstance that the $K^{th}$-round sort result is equal to the $(K-1)^{th}$-round sort result and the $(K+1)^{th}$-round sort result is equal to the $K^{th}$-round sort result, the sorting device terminates the N rounds of sorting processes and outputs the $(K+1)^{th}$-round sort result as the $N^{th}$-round sort result.

7. A sorting device configured to continuously perform N rounds of sorting processes from a first round sorting process to an $N^{th}$ round sorting process in turn to sort N numbers that are in an initial order and thereby obtain N-rounds sort results from a first-round sort result to an $N^{th}$-round sort result in turn, wherein at least two pairs of numbers of the N numbers are sorted concurrently in each of the N rounds of sorting processes, the N is an integer equal to or greater than five, and the sorting device comprises:

a processing circuit including:

X sorting circuits configured to perform parallel computing, wherein each of the X sorting circuits is configured to sort two numbers of the N numbers and thereby obtain a collating sequence of the two numbers, the X is an integer greater than two and not less than $$\frac{N-1}{2},$$

at least $$\frac{N-2}{2}$$

sorting circuits of the X sorting circuits concurrently sort at least (N−2) numbers of the N numbers for the parallel computing in each of the N rounds of sorting processes when the N is an even integer, and at least $$\frac{N-1}{2}$$

sorting circuits of the X sorting circuits concurrently sort at least (N−1) numbers of the N numbers for the parallel computing in each of the N rounds of sorting processes when the N is an odd integer; and Y duplicating circuit(s), each of which is configured to receive an input number and output the input number as an output number, wherein the Y is a positive integer;

a selecting circuit configured to output the N numbers in the initial order to the processing circuit in the first round sorting process and configured to output an (M−1)$^{th}$-round sort result of the N-rounds sort results to the processing circuit in an M$^{th}$ round sorting process of the N rounds of sorting processes, wherein the M is an integer between the N and two; and a control circuit including a counter configured to output a count number to control the selecting circuit and the processing circuit, wherein when the count number is an initial number, the selecting circuit outputs the N numbers in the initial order to the processing circuit which then generates the first-round sort result accordingly; when the count number is not the initial number, the selecting circuit outputs the (M−1)$^{th}$-round sort result to the processing circuit which then generates an M$^{th}$-round sort result of the N-rounds sort results accordingly; when the count number is an odd number exclusive of the initial number, a first group of sorting circuits among the plurality of sorting circuits is enabled to perform a sorting operation while a second group of sorting circuits among the plurality of sorting circuits is disabled or idled; when the count number is an even number exclusive of the initial number, the first group of sorting circuits is disabled or idled while the second group of sorting circuits is enabled to perform the sorting operation; and when the count number is not the initial number, at least one of the plurality of duplicating circuits is enabled to perform a duplicating operation.

8. The sorting device of claim 7, wherein each of the X sorting circuits includes:

a comparing circuit configured to compare the two numbers and thereby generate a comparison result;

a first selecting circuit configured to output a first number among the two numbers according to the comparison result; and a second selecting circuit configured to output a second number among the two numbers according to the comparison result, wherein in a circumstance that the two numbers differ from each other, the first number is one of a larger number and a smaller number of the two numbers and the second number is the other one of the larger number and the smaller number.

9. The sorting device of claim 7, wherein each of the Y duplicating circuit(s) includes a transmission wire.

* * * * *